United States Patent
Anstey et al.

(10) Patent No.: US 7,191,699 B1
(45) Date of Patent: Mar. 20, 2007

(54) SHIELD FOR PREVENTING CROP BUILD-UP AFFECTING GATE CLOSURE ON ROUND BALER

(75) Inventors: Henry Dennis Anstey, Ottumwa, IA (US); John David Burger, Ottumwa, IA (US); Steven Dave Anton, Cedar Falls, IA (US); Steven R. Pilcher, Bloomfield, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/442,869

(22) Filed: May 30, 2006

(51) Int. Cl.
*B30B 5/04* (2006.01)
*A01D 39/00* (2006.01)

(52) U.S. Cl. .............. 100/87; 100/88; 56/341
(58) Field of Classification Search .......... 100/87, 100/88, 89, 100, 175, 177; 56/341, 344
See application file for complete search history.

(56) References Cited

U.S. PATENT DOCUMENTS 4,424,662 A * 1/1984 Eggers et al. ........... 56/341
5,070,780 A * 12/1991 Viaud et al. ........... 100/88
6,006,504 A * 12/1999 Myers et al. ........... 53/556
6,421,996 B1 * 7/2002 Deutsch et al. ........... 56/341

* cited by examiner

*Primary Examiner*—Lowell A. Larson
*Assistant Examiner*—Jimmy T. Nguyen

(57) ABSTRACT

A shield is provided for preventing crop build-up above the axle and behind the pickup frame from interfering with the closure of the gate after bale discharge. A spring member is interposed between the baler frame and a deflector surface. Preferably the spring member occupies the entire space between the baler frame and the deflector thereby preventing any accumulation of crop material in that space. As the gate of the baler begins to close a gate shield of the baler contacts the deflector surface and compresses the spring member allowing the deflector surface to deflect toward the baler frame. Because crop material cannot build up in the area occupied by the spring member and deflector surface, deflection of the deflector surface provides a clean path for the gate shield allowing the gate to close without interference from crop material build-up. When the gate is opened again the spring member expands pushing the deflector surface and any accumulated crop material toward the center of the baler. A cover is also provided to prevent crop material from entering any space between the frame and the deflector surface and/or the spring member.

32 Claims, 10 Drawing Sheets

SHIELD FOR PREVENTING CROP BUILD-UP AFFECTING GATE CLOSURE ON ROUND BALER

FIELD OF THE INVENTION

The present invention relates generally to agricultural balers. More particularly, the present invention relates to balers that produce a round or cylindrical bale. Specifically, the present invention relates to shields for preventing crop build-up from affecting closure of the bale discharge gate.

BACKGROUND OF THE INVENTION

It has been found that in round balers having a pivoting bale discharge gate, crop buildup above the axle and behind the pickup frame may prevent the bale discharge gate from closing when baling in a various crops and crop conditions (alfalfa, grass, cornstalks, for example). This problem tends to occur intermittently in some conditions, but when the problem does occur the frequency may be high (every 2–3 bales, for example). The baler operator must then leave the operator station and manually clean out the crop buildup before baling can continue, resulting in reduced efficiency and productivity, as well as inconvenience to the operator.

Accordingly, there is a clear need in the art for a means to prevent crop build-up from interfering with gate closure after bale discharge, that does not require intervention by the baler operator.

SUMMARY OF THE INVENTION

A deflector sheet is attached to each side of the baler above the axle and behind the pickup frame to move crop buildup out of the path of the lower front roll shields of the discharge gate. The shape and movement of the deflectors keeps crop material out of the gate shield path when the gate first opens until the gate moves the shields closed, just before the gate is fully shut. The crop buildup is moved away from the side of the baler closer to the center of the baler where it is picked up and removed by the baler belts as the gate closes. Springs, made of plastic foam or other materials, move the deflector out when the gate is opened, and allow the gate to move the deflector back when the gate is closed. The foam spring generally occupies the entire space between the frame and the deflector sheet, thereby preventing entry of crop material into that space. Covers mounted in front of the deflectors prevent crop material from getting behind the deflector, which would otherwise stop the deflector from closing when the gate is shut. The shape and movement of the deflectors keeps crop material out of the gate shield path when the gate first opens until the gate moves the shields closed, just before the gate is fully shut.

In view of the foregoing, it is an object of the invention to provide means to prevent crop build-up from interfering with gate closure after bale discharge.

Another object of the invention is the provision of such a means that does not require intervention from the baler operator.

A further object of the invention is to provide such a means that is readily adaptable to existing baler designs.

An additional object of the invention is the provision of such a means that can be retrofitted to existing balers.

The foregoing and other objects of the invention together with the advantages thereof over the known art which will become apparent from the detailed specification which follows, are attained by a shield for preventing crop build-up from interfering with gate closure on a cylindrical baler, the baler having a frame member and a gate that pivots relative to the frame member, the shield comprising: a deflector disposed proximal to the frame member, the deflector being disposed for contact with a portion of the gate when the gate closes so that the gate causes the deflector to deflect, thereby allowing the gate to close without interference from crop debris the deflector being biased toward a non-deflected position so that the deflector is returned to a non-deflected position when the gate is opened.

Other objects of the invention are attained by an improved baler for producing cylindrical bales of agricultural crop material, the baler having a plurality of baling elements, a front frame member, and a bale discharge gate comprised in part of a rear frame member that pivots relative to the front frame member, the discharge gate being pivotable relative to the front frame member between an open bale discharge position and a closed baling position, the discharge gate, when in the closed baling position, engaging the front frame member in an area subject to accumulation of crop debris, the improvement comprising: a deflector surface mounted to the front frame member in the area subject to accumulation of crop debris the deflector having a bias toward a non-deflected position; the deflector surface being disposed for contact with a portion of the discharge gate when the gate closes so that the gate causes the deflector surface to deflect, thereby allowing the gate to close without interference from crop debris, the bias operating to return the deflector surface toward a non-deflected position when the discharge gate is in the open bale discharge position, the return of the deflector surface to the non-deflected position serving to push accumulated crop debris toward a center of the baler where it can be picked up by the baling elements of the baler.

In general, a shield is provided for preventing crop build-up above the axle and behind the pickup frame from interfering with the closure of the gate after bale discharge. A spring member is interposed between the baler frame and a deflector sheet. Preferably the spring member occupies the entire space between the baler frame and the deflector thereby preventing any accumulation of crop material in that space. As the gate of the baler begins to close a gate shield of the baler contacts the deflector sheet and compresses the spring member allowing the deflector sheet to deflect toward the baler frame. Because crop material cannot build up in the area occupied by the spring member and deflector sheet, deflection of the deflector sheet provides a clean path for the gate shield allowing the gate to close without interference from crop material build-up. When the gate is opened again the spring member expands pushing the deflector sheet and any accumulated crop material toward the center of the baler. A cover is also provided to prevent crop material from entering any space between the frame and the deflector sheet and/or the spring member.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention reference should be made to the following detailed description and accompanying drawings, wherein.

DESCRIPTION OF THE PREFERRED EMBODIMENT

Figure 1:
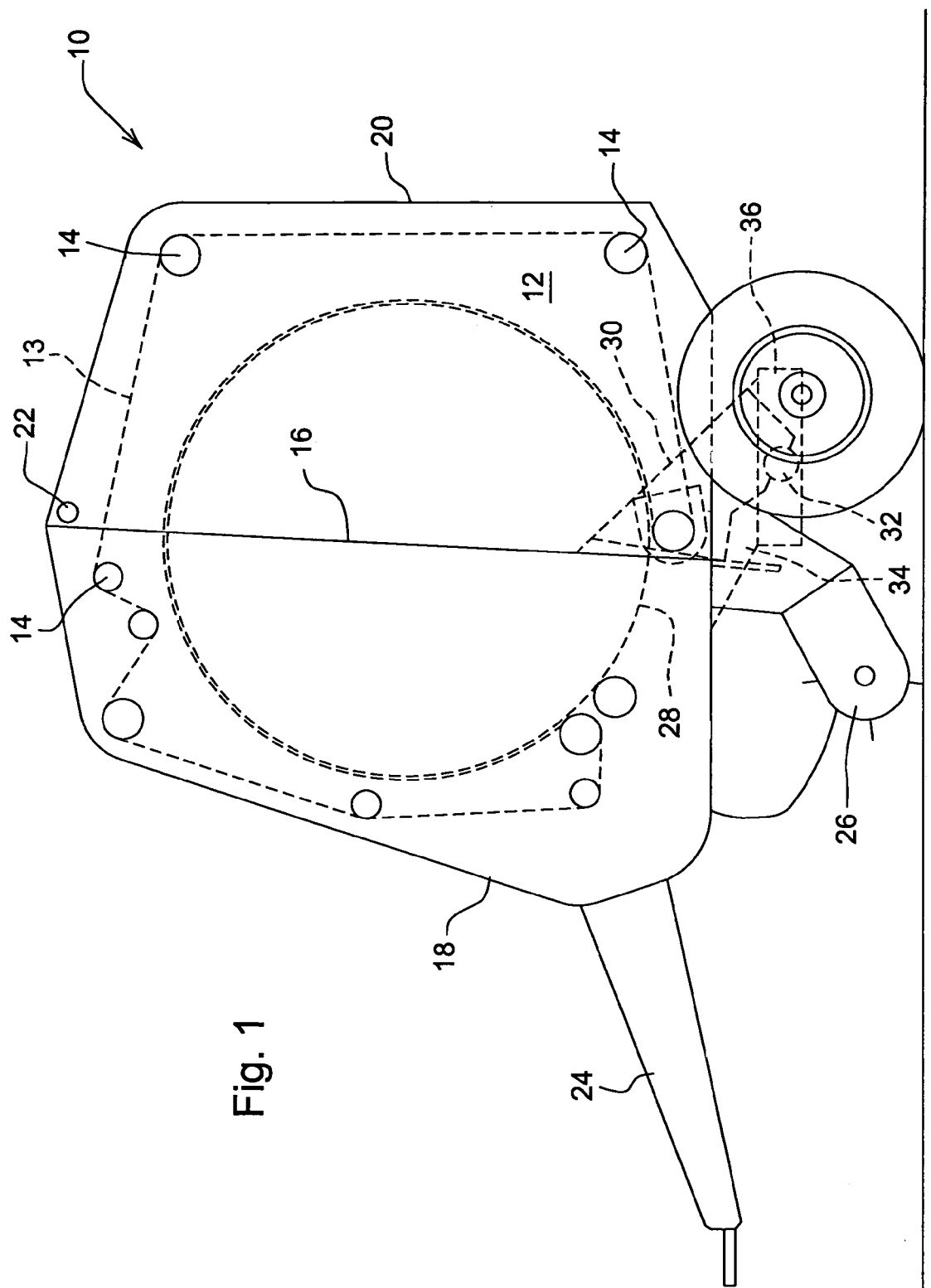
FIG. 1 is a schematic side view of a round baler having the shield according to the invention.

With reference now to the drawings and particularly FIG. 1, it can be seen that an exemplary agricultural baler for forming cylindrical bales of crop material is designated generally by the numeral 10. Baler 10 is generally comprised of a pair of opposed sidewalls 12, a plurality of longitudinally extending side-by-side baling elements or belts 13 are supported on a plurality of rollers 14 (only a few of which are shown). A bale forming chamber is defined by the sidewalls 12, the rollers 14 and belts 13. The sidewalls 12 (and the components contained therebetween) may be partitioned along a parting line 16 into a front frame section 18 and a bale discharge gate 20 pivotally mounted to front section 18 on a pivot 22. The bale discharge gate 20 is moveable back and forth between a closed position for bale formation and an open position for bale discharge by means of hydraulic cylinders (not shown).

In the general operation of the baler 10, the baler is drawn through a field by a prime mover (not shown) attached to a tongue 24. Crop material is fed into the bale forming chamber from a windrow of crop on the ground by a pickup 26. In the baler 10, the crop material is rolled in spiral fashion into a cylindrical bale 28. Upon completion, the bale 28 is wrapped with twine or other appropriate wrapping material and is discharged by actuation of gate cylinders that open gate 20 permitting the completed bale to be discharged from the baler onto the ground, after which the gate 20 is closed or returned to the position shown in FIG. 1. The invention herein resides in an improved mechanism for preventing a build-up of crop material above the axle and behind the pickup from interfering with the proper closure of the gate 20 as will be set forth in more detail below.

Figure 2:
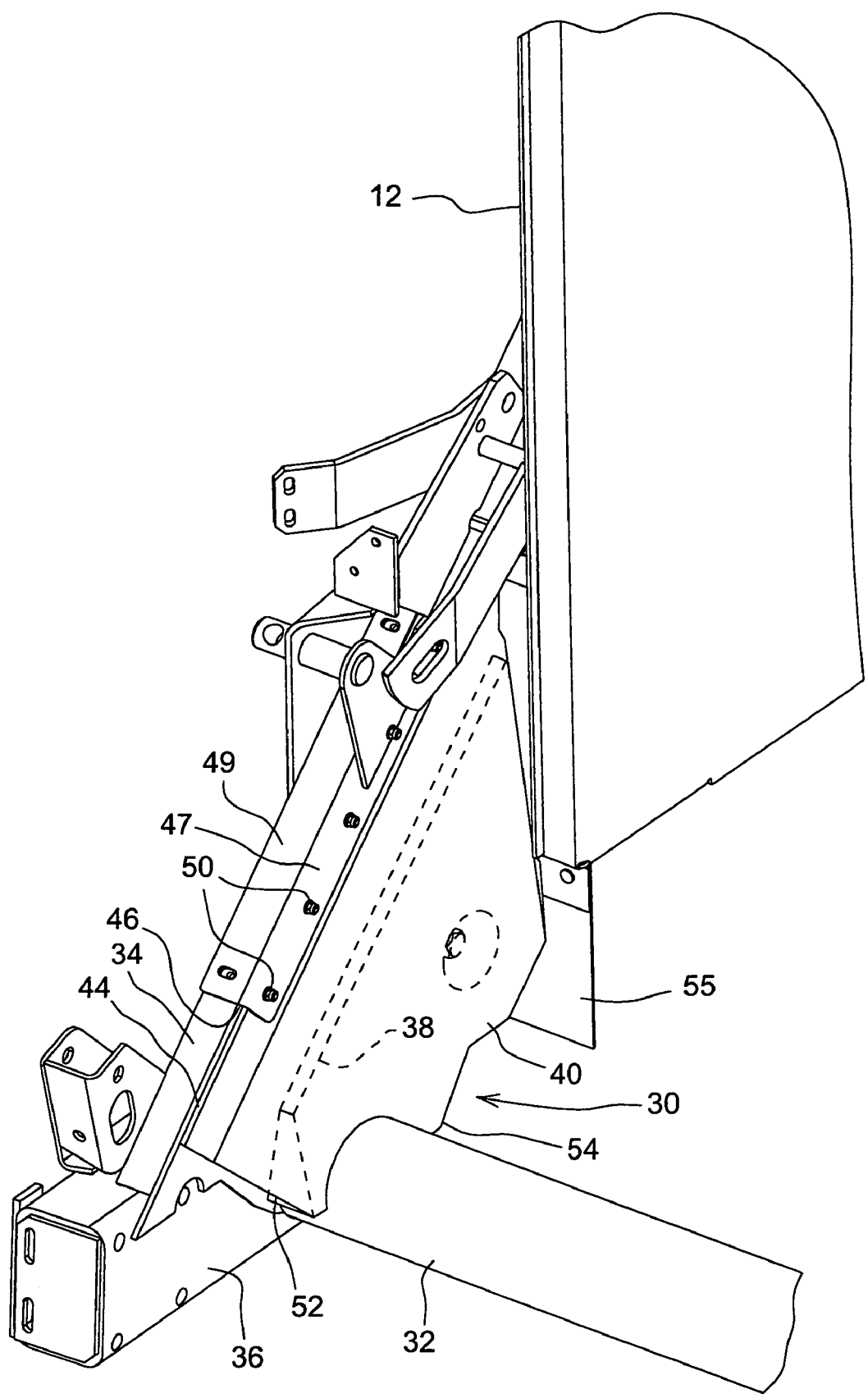
FIG. 2 is a perspective view of a portion of the baler of FIG. 1 showing the shield of the invention in detail.
Figure 3:
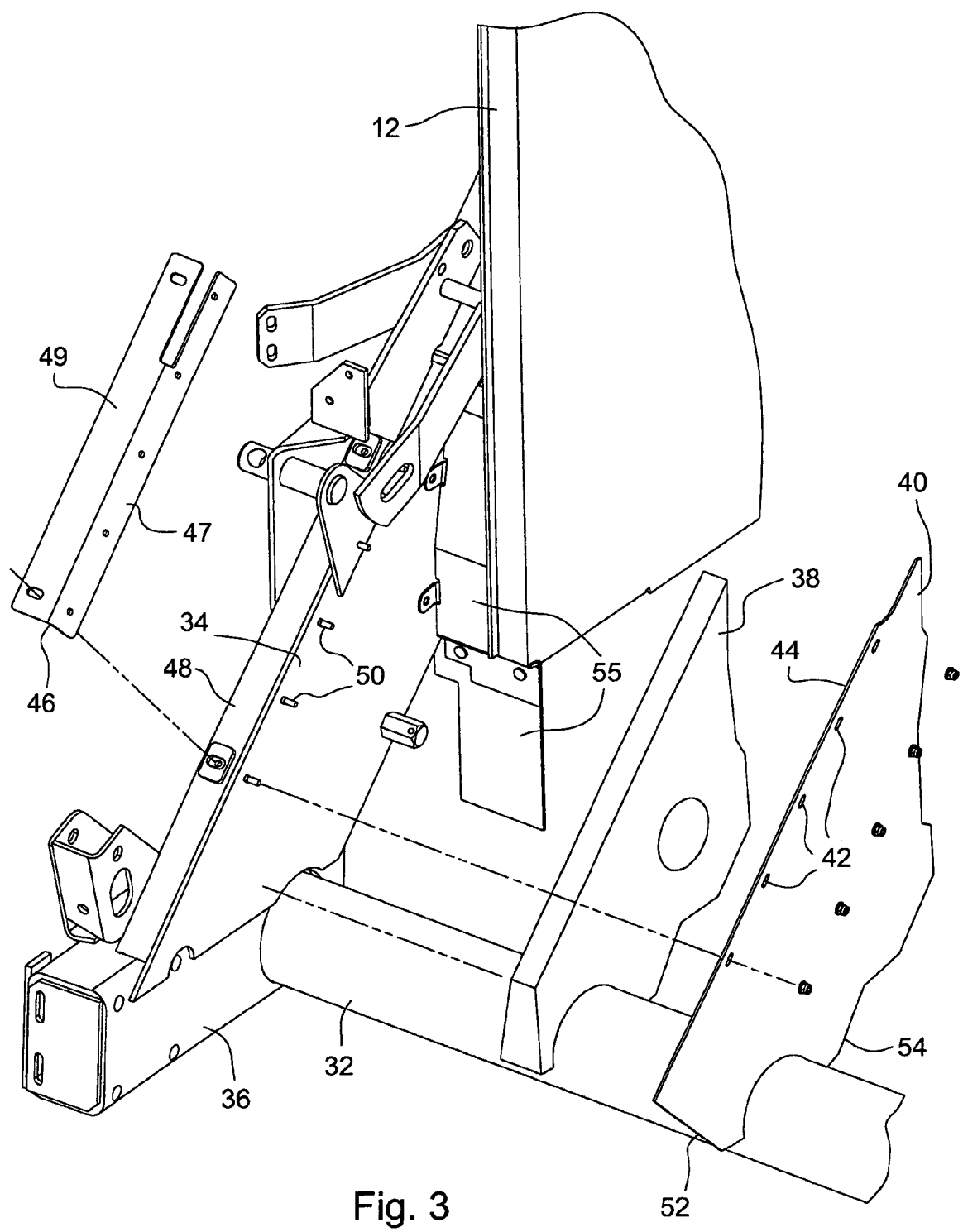
FIG. 3 is a view similar to FIG. 2 but with the parts of the shield exploded.

In the description that follows the shield according to the invention is described in conjunction with a left hand side of a baler with reference to the direction of travel through a field during normal operation. It is to be understood that, in a preferred embodiment, a baler will be equipped with two such shield assemblies, with one on either side of the baler. Those having skill in the art will recognize that the shield assembly provided on the right hand side of the baler will generally be a mirror image of the left hand shield assembly described and shown in the figures. With reference now also to FIGS. 2 and 3 a portion of the baler of FIG. 1 is shown in detail wherein a shield assembly 30 according to the invention is mounted. More particularly FIGS. 2 and 3 show a portion of a frame of a baler including an axle tube 32 and wheel drop 34 to which a wheel of the baler (not shown) is attached. As can be seen the wheel drop 34 extends angularly downward from the sidewall 12 of the baler and terminates at a wheel support tube 36 that is in turn attached to the transverse axle tube 32. The shield assembly 30, as is perhaps best shown in the exploded view of FIG. 3, comprises a bias means shown as a resilient foam spring member 38 which is installed adjacent to the wheel drop 34. A deflector surface, depicted as a flexible deflector sheet 40 in the preferred embodiment, is then mounted to the wheel drop 34 over the spring member 38. Those having skill in the art will recognize that the spring member 38 and deflector sheet 40 could be manufactured as a unitary member wherein the spring member 38 is bonded or adhered to the deflector sheet 40. In the preferred embodiment depicted, the deflector sheet 40 is provided with a number of fastener apertures 42 along a first edge 44 thereof. The shield assembly 30 further comprises a cover 46. The cover 46 has a first flange 47 that is installed over the first edge 44 of the deflector sheet 40 and a second flange 49 that is installed over an upper edge 48 of the wheel drop 34. Both the cover 46 and deflector sheet 40 are then secured to the wheel drop 34 by way of appropriate fasteners 50. It should noted that the deflector sheet 40 is secured to the wheel drop 34 only at the first edge 44 thereof so that the second 52 and third 54 edges thereof are free to move as the spring member 38 compresses and expands, as will be described in more detail below. A second cover 55 is provided to close the area behind the spring member 38 and deflector sheet 40.

Figure 4:
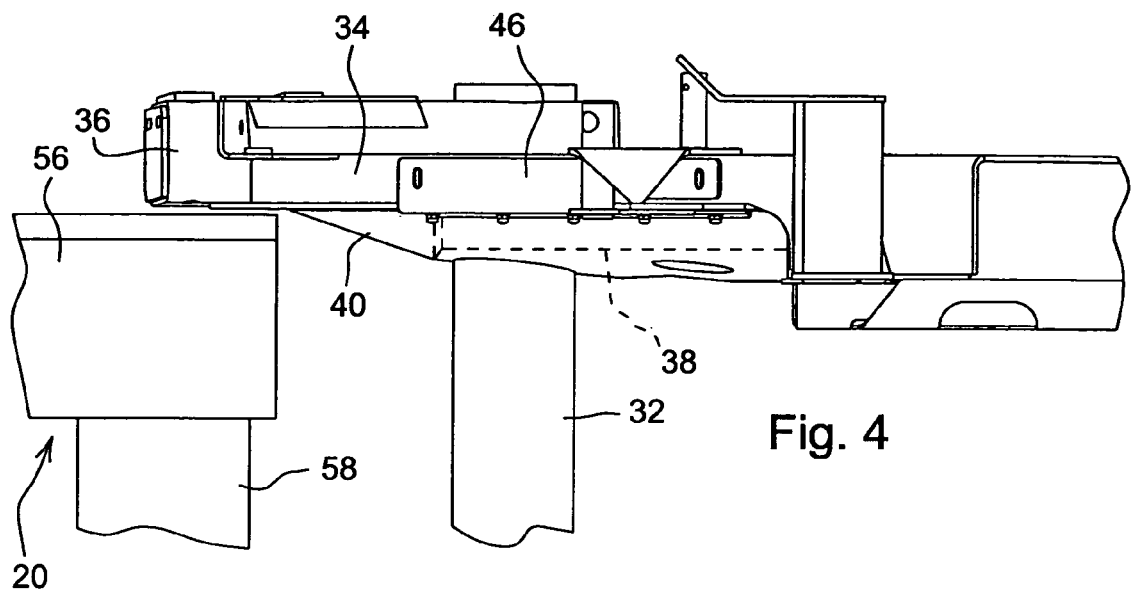
FIG. 4 is a top view of a portion of the baler showing operation of the shield according to the invention just prior to gate closure.
Figure 5:
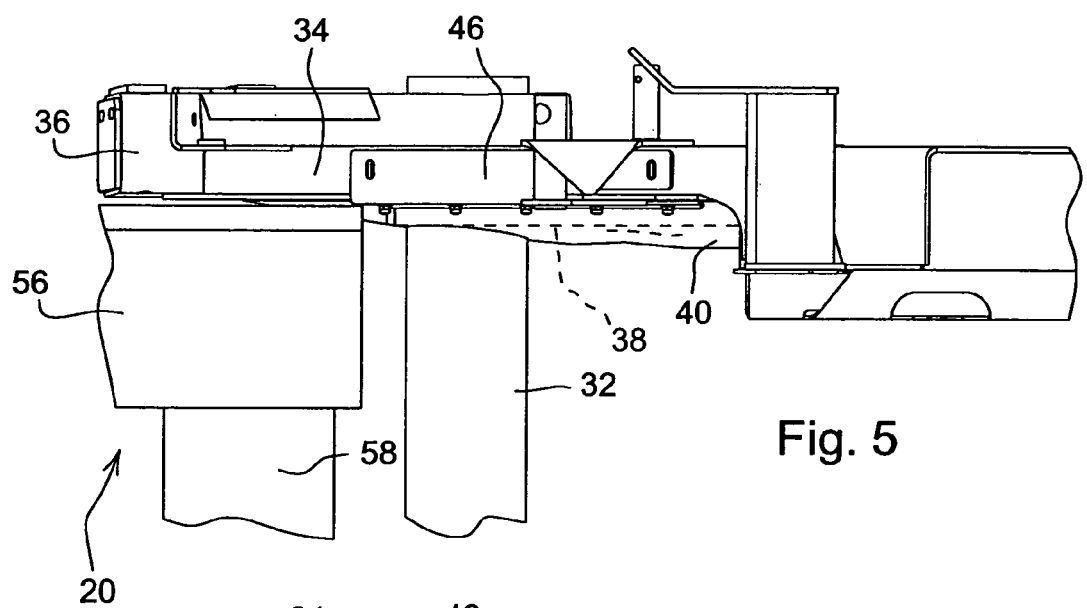
FIG. 5 is a view similar to FIG. 4 showing a further progression of the gate toward full closure.
Figure 6:
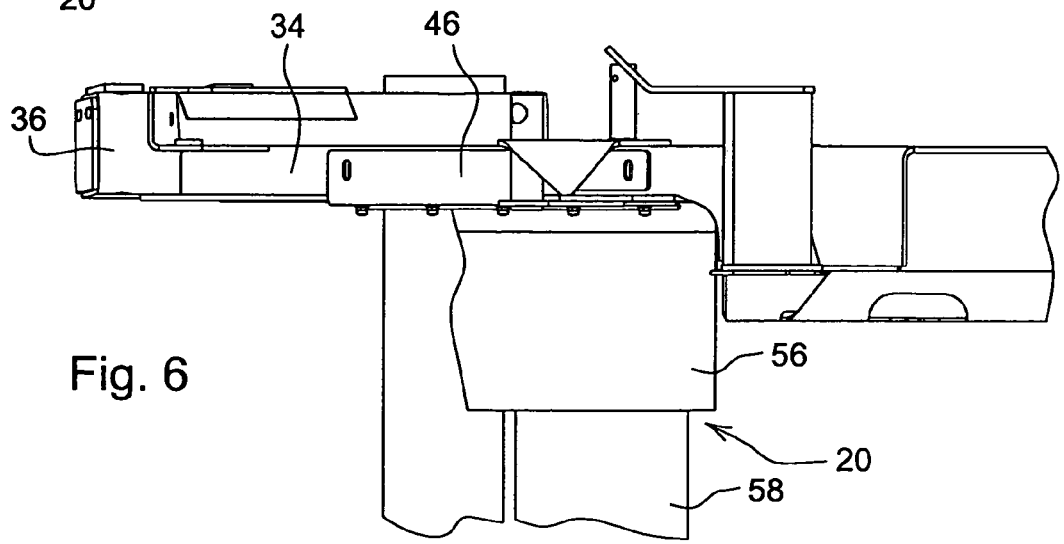
FIG. 6 is a view similar to FIGS. 4 and 5 showing the gate in the fully closed position.

With reference now to FIGS. 4–6 the operation of the present invention will be described in more detail. In FIG. 4 a bale has been discharged from the baler and the gate 20 is beginning to return to the closed position, however in FIG. 4 the gate shield 56 around the lower front gate roll 58 has not yet contacted the deflector sheet 40. It should be apparent that at this point in time the area around the deflector sheet 40 may be fouled with crop material, however such crop material is prevented from accumulating in the gate shield path due to the presence of the spring member 38 and deflector sheet 40. When the gate shield 56 contacts the deflector sheet 40, as illustrated in FIG. 5, the spring member 38 begins to compress allowing the deflector sheet 40 to deflect toward the wheel drop 34. The gate shield 56 is then allowed to move into the fully closed position, as shown in FIG. 6, without interference from accumulated crop material. When the gate is again opened for bale discharge the spring force provided by the spring member 38 returns the deflector sheet 40 to the position of FIG. 4 and pushes away any accumulated crop material. The covers 46 and 55 prevents crop material from entering the space between the wheel drop 36 and the spring member 38 or the deflector sheet 40. Thus the path of the gate shield during closure is at all times kept free from crop debris that would otherwise interfere with gate closure. Additionally, crop debris is urged toward the center of the baler where it can be picked up and removed by the baler belts as the gate closes.

It will be noted that the use of a foam spring member is particularly advantageous in that the foam spring entirely fills the space between the deflector surface and the frame and accordingly excludes crop material from accumulating in this area. Those having skill in the art will recognize that the present invention can readily be provided on newly manufactured balers as well as being easily and inexpensively retrofitted to existing balers.

Figure 7:
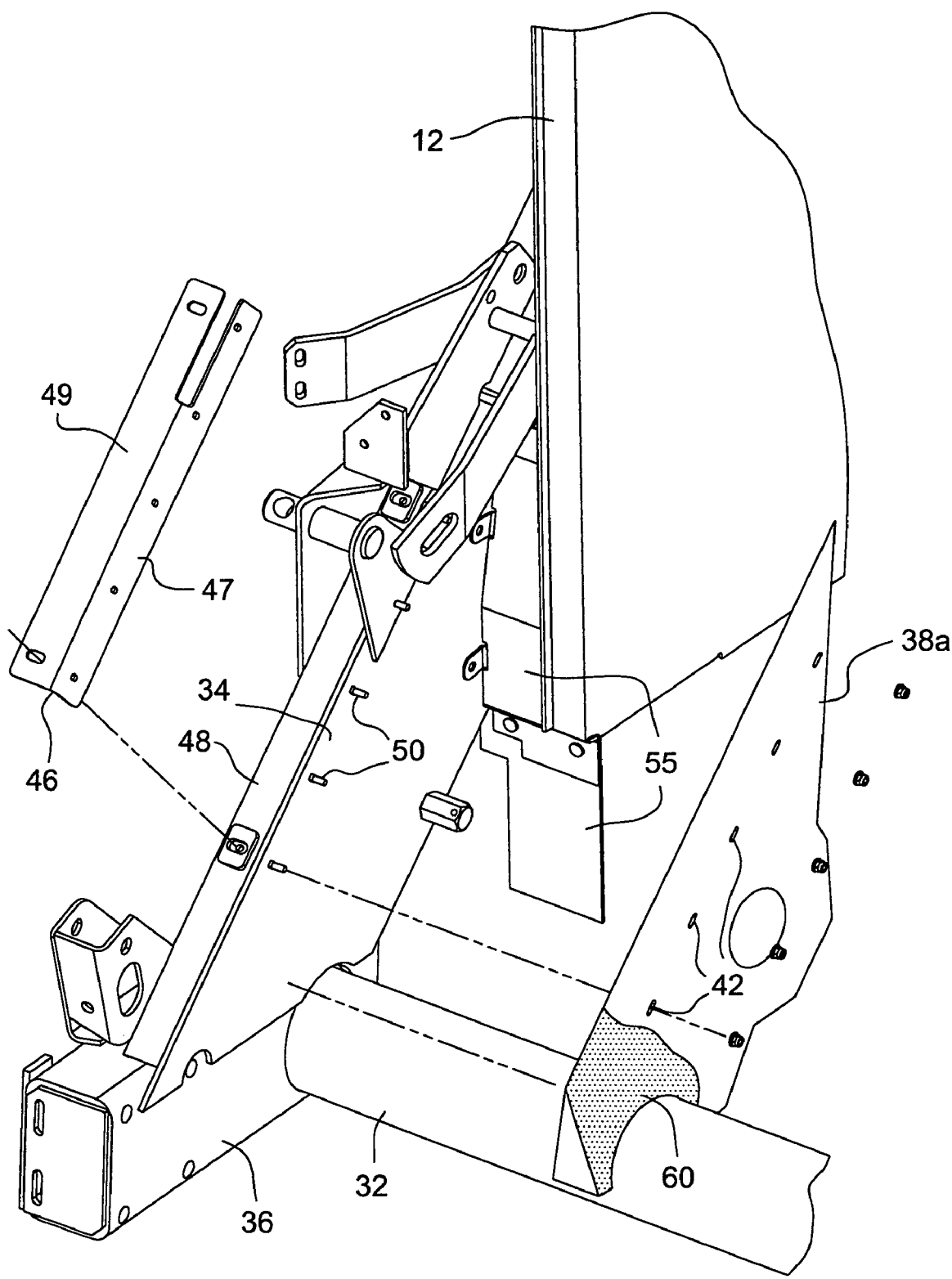
FIG. 7 is a view similar to FIG. 3 showing an alternative embodiment of the invention.

In the alternative embodiment depicted in FIG. 7 the spring member 38a is manufactured from a particularly wear resistant material or is provided with a wear resistant coating 60 serving as the deflector surface thereby eliminating the need for a separate deflector sheet.

Figure 8:
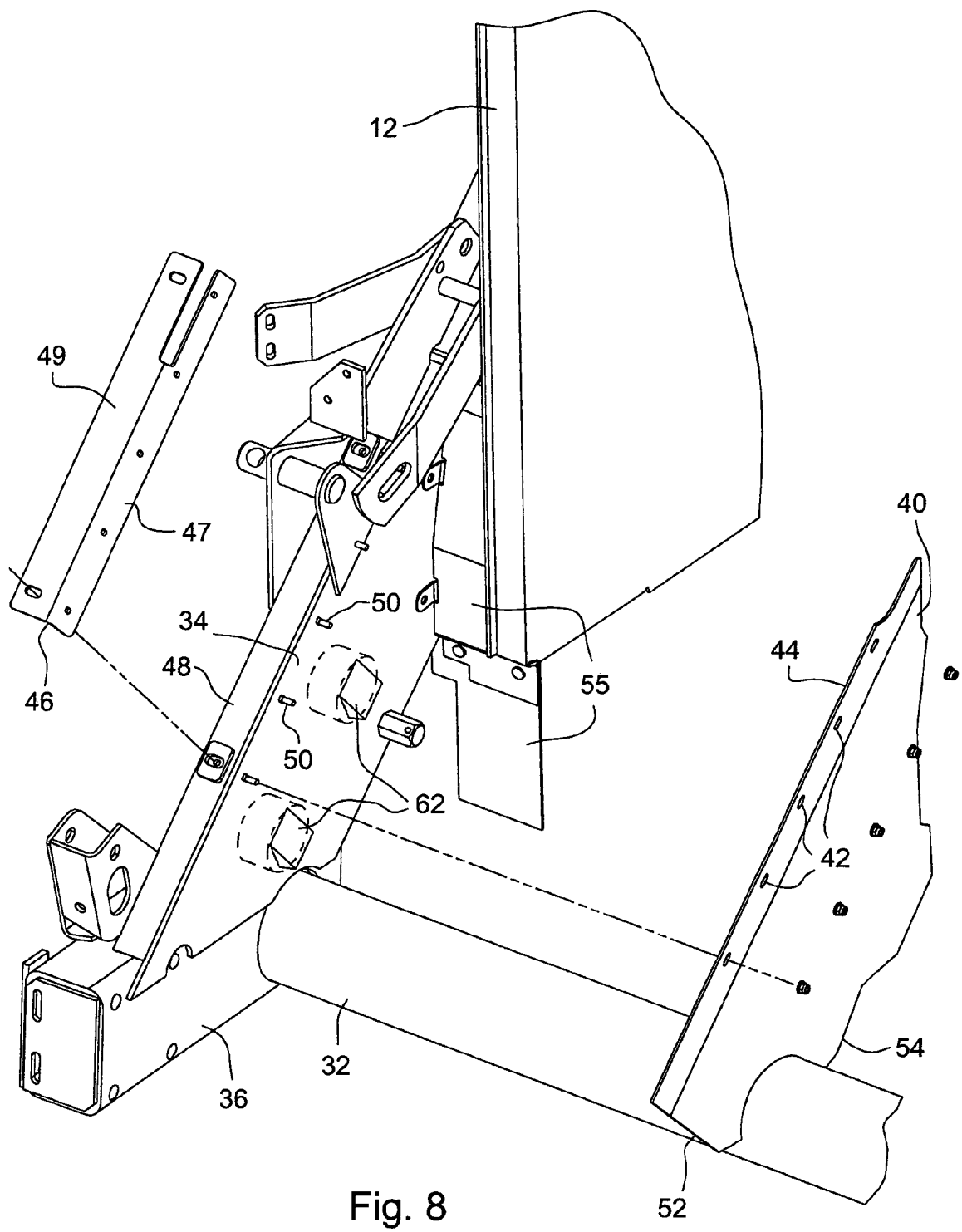
FIG. 8 is a view similar to FIG. 3 showing another alternative embodiment of the invention.
Figure 11:
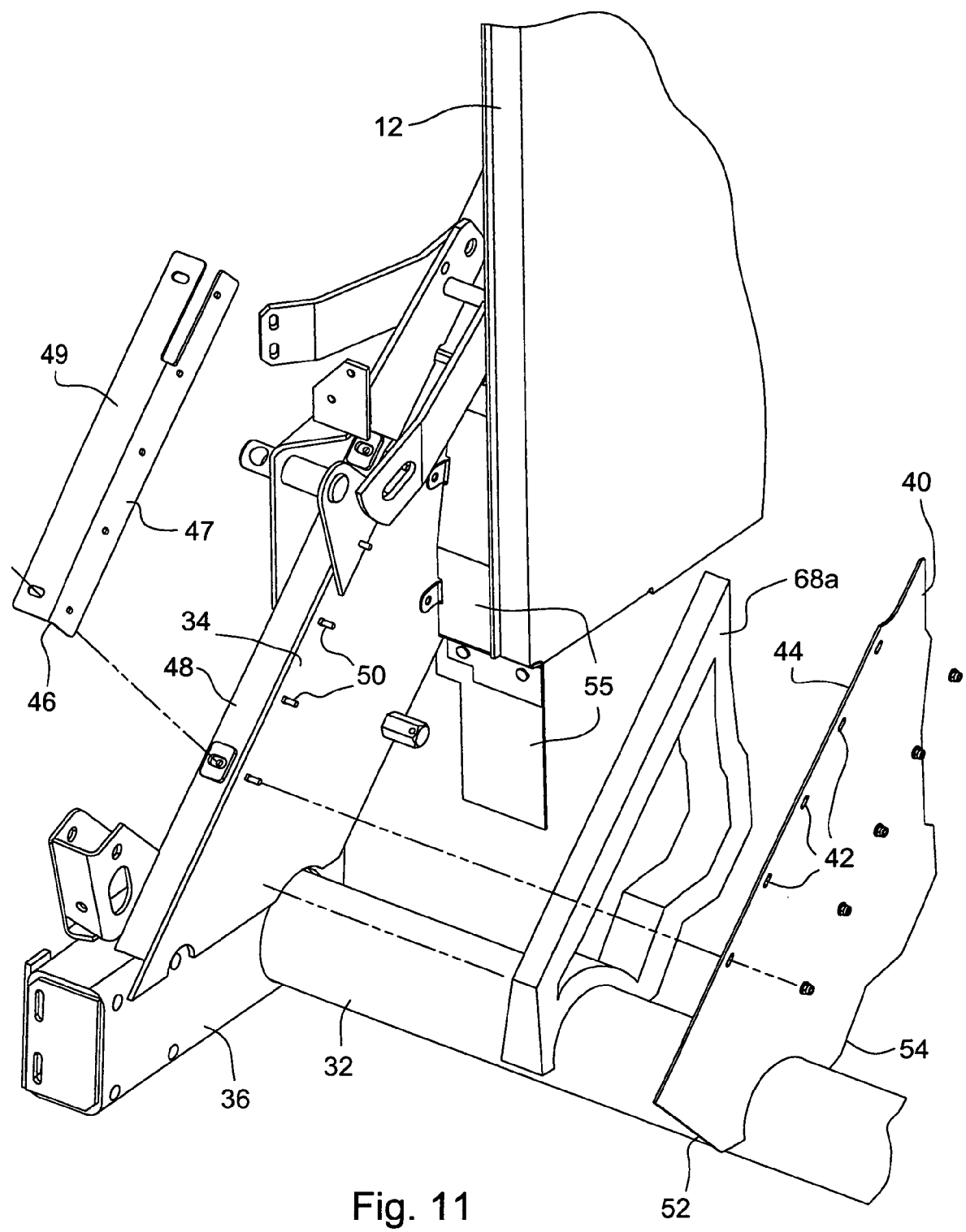
FIG. 11 is a view similar to FIG. 3 showing an embodiment of a perimeter seal according to the invention; and, FIG. 12 is a view similar to FIG. 3 showing an alternative embodiment of a perimeter seal according to the invention.
Figure 12:
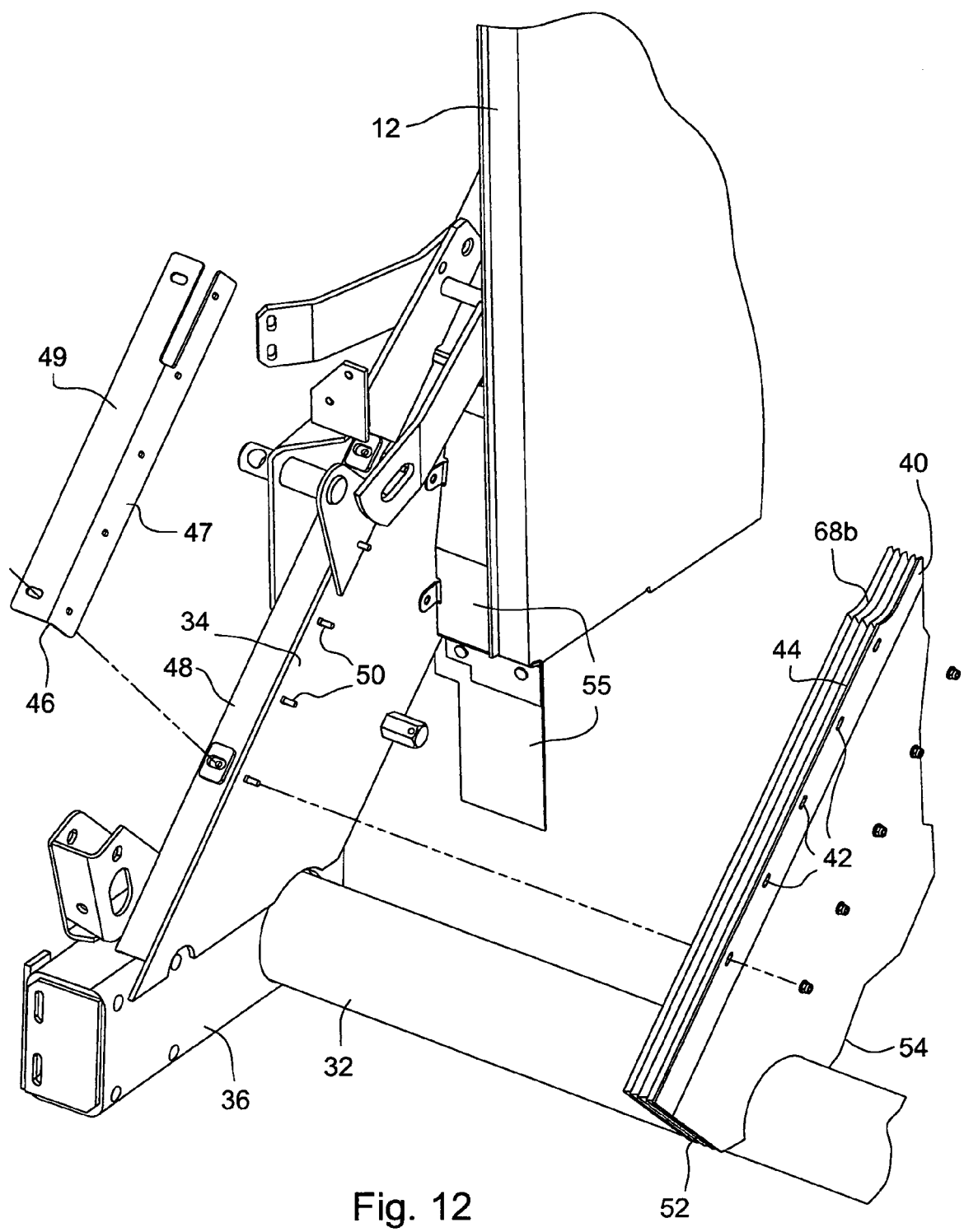

In another alternative embodiment illustrated in FIG. 8 the foam spring has been replaced with one or more hydraulic, pneumatic or mechanical spring elements 62 capable of allowing the deflector surface to deflect in response to gate contact and further returning the deflector surface to a non-deflected position when the gate is opened. Those having skill in the art will recognize that the spring 62 could be in the form of mechanical leaf or coil springs, or hydraulically or pneumatically actuated cylinders. In this embodiment it might further be desirable to provide the deflector with a perimeter seal 68 as shown in FIGS. 11 and 12 and described in more detail below. Such a perimeter seal 68 would prevent the entry of crop debris into the area between the deflector sheet 40 and the frame 34.

Figure 9:
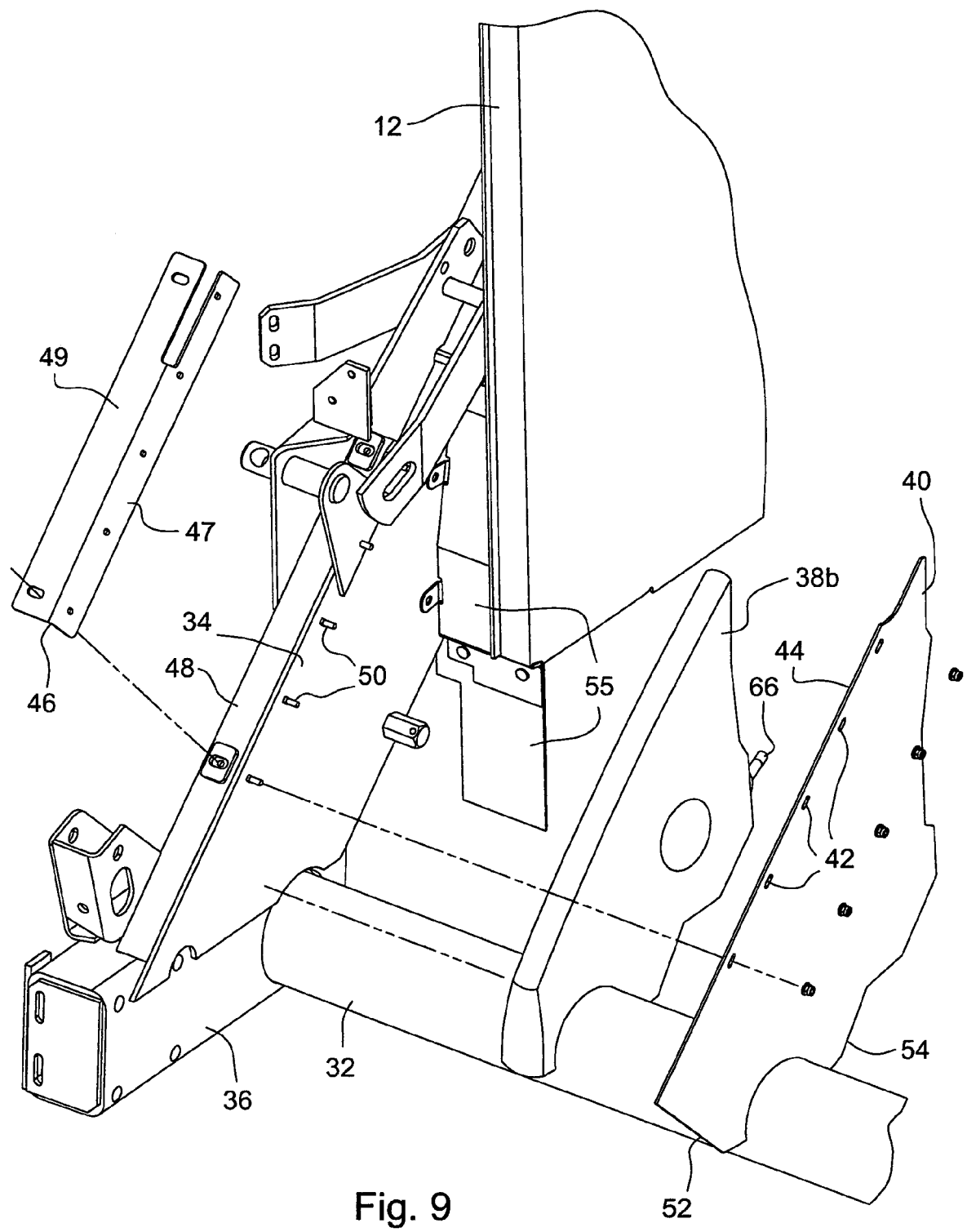
FIG. 9 is a view similar to FIG. 3 showing yet another alternative embodiment of the invention.

In another alternative embodiment illustrated in FIG. 9, an inflatable bladder 38b is substituted for the foam spring. In this case the bladder 38b could also be fitted to fill the entire space between the frame 34 and the deflector sheet 38b and the inflation of the bladder 38b would serve as a bias for returning the deflector to the non-deflected position. In this regard it is also possible that if an inflatable bladder 38b is used, the need for a separate deflector sheet 40 could possibly be eliminated if appropriate wear resistant materials are used in the manufacture of the bladder 38b. An appropriate source of air (not shown) would be provided along with a valve 66 or other means to introduce air into the bladder 38b when the gate is raised or opened. Other means (not shown) would be provided to allow for evacuation of air from the bladder 38b when the gate is closed.

Figure 10:
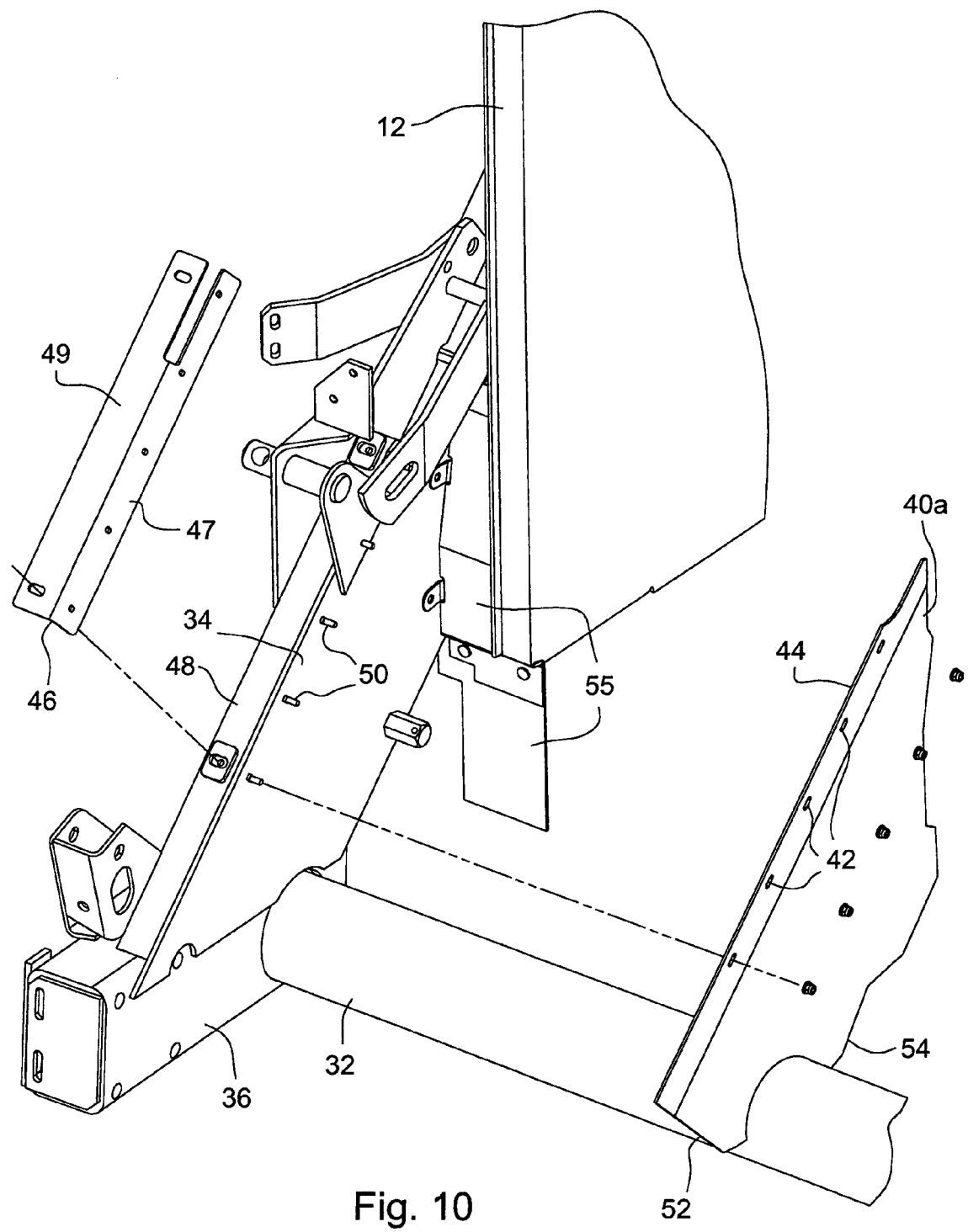
FIG. 10 is a view similar to FIG. 3 showing a further embodiment of the invention.

In yet another embodiment illustrated in FIG. 10 the deflector sheet 40a is manufactured from a material having a spring characteristic that serves as the bias for returning the deflector to the non-deflected position when the gate is opened. In this case it is not necessary to have a discrete spring member interposed between the frame 34 and the deflector sheet 40a.

As previously discussed, it is within the scope of the invention to provide for a spring bias by way of spring members that do not fill the entire space between the frame and the deflector surface. In such instances it may be desirable to provide a perimeter seal 68 between the deflector surface 40 and the frame 34 to prevent crop material from accumulating in this space as illustrated in FIGS. 11 and 12. More particularly FIG. 11 shows a first embodiment of a perimeter seal 68a. It is contemplated that such a perimeter seal 68a could be manufactured from a resilient material such as rubber or plastic foam that has a sufficient spring characteristic to allow the deflector surface 40 to deflect and still bias the deflector surface 40 toward a non-deflected position without the need for additional spring means, or the seal 68a could be used in conjunction with a mechanical, hydraulic, or pneumatic spring member, as described above, for the purpose of preventing entry of crop material between the deflector surface 40 and the frame 34. In the embodiment shown in FIG. 12 the perimeter seal 68b is in the form of a resilient rubber or plastic gasket that is attached to both the frame 34 and the deflector sheet 40. It is contemplated that the seal 68b could have an accordion-shaped cross section to allow the deflector sheet 40 to move readily relative to the frame 34. It further contemplated that the seal 68b could have a sufficient spring characteristic to allow the deflector surface 40 to deflect and still bias the deflector surface 40 toward a non-deflected position without the need for additional spring means, or the seal 68b could be used in conjunction with a mechanical, hydraulic, or pneumatic spring member as described above for the purpose of preventing entry of crop material between the deflector surface 40 and the frame 34.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The embodiments of the invention in which an exclusive property or privilege is claimed are defined as follows:

1. A shield for preventing crop build-up from interfering with gate closure on a cylindrical baler, the baler having a frame member, a gate that pivots relative to the frame member, and a gate shield surrounding a lower gate roller of the gate, the shield comprising:

a deflector disposed proximal to the frame member, the deflector being disposed for contact with the gate shield of the gate when the gate closes so that the gate shield causes the deflector to deflect, thereby allowing the gate to close without interference from crop debris the deflector being biased toward a non-deflected position so that the deflector is returned to a non-deflected position when the gate is opened.

2. A shield according to claim 1 wherein the deflector is biased toward a non-deflected position by a spring member interposed between the deflector and the frame member.

3. A shield according to claim 1 wherein the deflector is biased toward a non-deflected position by an inflatable bladder.

4. A shield according to claim 3 wherein the inflatable bladder is interposed between the deflector and the frame member.

5. A shield according to claim 1 wherein the deflector comprises an inflatable bladder, an inflation of which serves to bias the deflector toward to a non-deflected position.

6. A shield assembly according to claim 1 wherein the deflector is a deflector sheet manufactured from a flexible sheet material.

7. A shield according to claim 6 wherein the deflector sheet has a spring characteristic and the deflector is biased toward the non-deflected position due to the spring characteristic of the deflector sheet.

8. A shield assembly according to claim 2 wherein the spring member is comprised of at least one of a hydraulic, pneumatic, or mechanical spring element.

9. A shield assembly according to claim 2 wherein the spring member is comprised of one of a resilient: plastic, rubber or foam material.

10. A shield assembly according to claim 9 wherein the spring member substantially fills a space between the frame member and the deflector surface thereby excluding crop material from occupying the space.

11. A shield assembly according to claim 9 wherein the spring member is bonded to the deflector.

12. A shield assembly according to claim 9 wherein the deflector is a wear resistant coating or material applied to the spring member.

13. A shield according to claim 1 further comprising a cover member mounted over both the frame member and the deflector to prevent crop material from entering a space between the frame member and the deflector.

14. A shield assembly according to claim 1 wherein the frame member is a wheel drop of the baler.

15. A shield assembly according to claim 1 wherein the deflector is provided with a perimeter seal to prevent the entry of crop material between the deflector and the frame.

16. A shield assembly according to claim 15 wherein the perimeter seal has a resilient spring characteristic, the resilient spring characteristic acting to bias the deflector toward the non-deflected position.

17. An improved baler for producing cylindrical bales of agricultural crop material, the baler having a plurality of baling elements, a front frame member, a bale discharge gate, and a gate shield surrounding a lower gate roller of the discharge gate, the discharge gate comprised in part of a rear frame member that pivots relative to the front frame member, the discharge gate being pivotable relative to the front frame member between an open bale discharge position and a closed baling position, the discharge gate, when in the closed baling position, engaging the front frame member in an area subject to accumulation of crop debris, the improvement comprising:

a deflector surface mounted to the front frame member in the area subject to accumulation of crop debris the deflector surface having a bias toward a non-deflected position;

the deflector surface being disposed for contact with the gate shield of the discharge gate when the gate closes so that the gate shield causes the deflector surface to deflect, thereby allowing the gate to close without interference from crop debris, the bias operating to return the deflector surface toward a non-deflected position when the discharge gate is in the open bale discharge position, the return of the deflector surface to the non-deflected position serving to push accumulated crop debris toward a center of the baler where it can be picked up by the baling elements of the baler.

18. An improved baler to claim 17 wherein the deflector surface is biased toward a non-deflected position by a spring member interposed between the deflector surface and the frame member.

19. An improved baler according to claim 18 wherein the spring member is comprised of at least one of a: hydraulic, pneumatic, or mechanical spring element.

20. An improved baler according to claim 18 wherein the spring member is interposed between the deflector surface and the frame member.

21. An improved baler according to claim 17 wherein the bias is provided by an inflatable bladder.

22. An improved baler according to claim 21 wherein the inflatable bladder is interposed between the deflector surface and the frame member.

23. An improved baler according to claim 17 wherein the deflector surface comprises an inflatable bladder, an inflation of which provides the bias.

24. An improved baler according to claim 18 wherein the spring member is comprised of one of a resilient: plastic, rubber or foam material.

25. An improved baler according to claim 24 wherein the spring member substantially fills a space between the frame member and the deflector surface thereby excluding crop material from occupying the space.

26. An improved baler according to claim 25 wherein the deflector surface is a wear resistant coating or material applied to the spring member.

27. An improved baler according to claim 24 wherein the spring member is bonded to the deflector surface.

28. An improved baler according to claim 17 wherein the deflector surface is a deflector sheet manufactured from a flexible sheet material.

29. An improved baler according to claim 28 wherein the deflector sheet has a spring characteristic, the spring characteristic of the deflector sheet providing the bias.

30. An improved baler according to claim 17 wherein the improvement further comprises a cover member mounted over both the frame member and the deflector surface to prevent crop material from entering a space between the frame member and the deflector surface.

31. An improved baler according to claim 17 wherein the deflector surface is provided with a perimeter seal to prevent the entry of crop material between the deflector surface and the frame.

32. An improved baler according to claim 31 wherein the perimeter seal has a resilient spring characteristic, the resilient spring characteristic acting to bias the deflector toward the non-deflected position.

* * * * *